United States Patent [19]

Hagg et al.

[11] 4,167,378

[45] Sep. 11, 1979

[54] APPARATUS FOR SHREDDING AND DRY-DEFIBRATING COMPRESSED CELLULOSE PULP AND FORMING A BATT OF THE RESULTING CELLULOSIC FIBROUS MATERIAL

[75] Inventors: Per B. Hagg, Ornskoldsvik; Sven I. Bergström, Bjasta; Lars E. Lundmark, Jarved; Carl-Erik L. Hedberg, Ornskoldsvik, all of Sweden

[73] Assignee: Mo och Domsjo AB, Ornskoldsvik, Sweden

[21] Appl. No.: 765,508

[22] Filed: Feb. 4, 1977

[30] Foreign Application Priority Data

| | | | |
|---|---|---|---|
| Feb. 6, 1976 | [SE] | Sweden | 7601328 |
| Sep. 10, 1976 | [SE] | Sweden | 7610047 |

[51] Int. Cl.² .......................... B29C 13/00; B29D 7/00

[52] U.S. Cl. .................................. 425/82.1; 425/83.1; 425/141; 425/148; 425/140; 425/217

[58] Field of Search .................... 425/82, 83, 140, 148, 425/135, 217, 141

[56] References Cited

U.S. PATENT DOCUMENTS

| | | | |
|---|---|---|---|
| 2,764,779 | 10/1956 | Zona | 425/140 |
| 3,150,213 | 9/1964 | Doering | 425/140 X |
| 3,150,215 | 9/1964 | Houghton | 425/82.1 X |
| 3,214,311 | 10/1965 | Schwab et al. | 425/82.1 X |
| 3,356,780 | 12/1967 | Cole | 425/83.1 X |
| 3,644,078 | 2/1972 | Tachibana et al. | 425/82.1 X |
| 3,737,265 | 6/1973 | Schafer et al. | 425/140 |
| 3,961,397 | 6/1976 | Neuenschwander | 425/82.1 X |

*Primary Examiner*—Robert L. Spicer, Jr.

[57] ABSTRACT

A method and apparatus are provided for shredding and dry-defibrating compressed cellulose pulp, and depositing the resulting fibrous material on a foraminous support to form a batt of relatively uniform density while controlling the feed of cellulose pulp material through the shredding and dry-defibrating operations to the foraminous support according to the output rate of the batt-forming operation, to ensure a relatively uniform density in the batt withdrawn from the foraminous support.

18 Claims, 7 Drawing Figures

APPARATUS FOR SHREDDING AND DRY-DEFIBRATING COMPRESSED CELLULOSE PULP AND FORMING A BATT OF THE RESULTING CELLULOSIC FIBROUS MATERIAL

The feed of cellulose pulp material to a dry defibrator normally requires that the pulp be in a loosely compressed form, such as in rolls of loosely compressed cellulose pulp, or loosely compressed pulp sheets. It is necessary that the pulp be only loosely compressed because of the heat developed when tightly compressed or moderately compressed pulp is defibrated. The heat liberated in the course of processing such materials may be so great that the pulp fibers are ignited. Moreover, particles of tightly compressed or moderately compressed pulp may jam the grinding members of the defibrator. However, loosely compressed pulp is much more expensive than tightly compressed or moderately compressed pulp. Therefore, this is a considerable disadvantage, which the art has sought to avoid.

In order to make it possible to utilize tightly compressed or moderately compressed sheet pulp in a defibrator, it has been proposed that the pulp be first dry-shredded to pieces from ½ to 1½ inches in diameter, which pieces can then be fed to the defibrator, such as, for example, a disc defibrator. When this is done, however, it is very difficult to achieve a uniform and constant discharge rate of defibrated pulp fibers from the defibrator, with the result that it is not possible to discharge the defibrated pulp material directly to a batt-forming machine. If the feed of defibrated material to the batt-forming machine is not uniform, the batts that are formed have varying proportions of fibers per unit area, with a resulting variation in density.

Why it is difficult to obtain a uniform discharge rate from a defibrator when using shredded pulp as the starting material is not easy to explain. The pulp particles from the shredded do tend to have a variable consistency, possibly because friction in the shredder imparts varying electrostatic charges to the particles. The particles as a result have a variable tendency to adhere to one another to form clumps, and the resulting clumps have differing degrees of coherence.

In any event, the fiber batts obtained in such processes have varied considerably in density from one portion to the next, which in turn has resulted in varying uniformity in the products made therefrom, such as diapers, sanitary pads, compresses, and the like.

In an attempt to counteract the variations in density, it has been proposed that a peg-roller or similar milling member operate in contact with the surface of the batt, to smooth the batt to a uniform thickness, and give it an even surface. This has not been successful in increasing the uniformity of the batt material, because the cellulose fibers have a tendency to adhere to the roller between the pegs, and wind up on the roller, with the result that eventually the pegs are completely buried in a mass of fibrous material, and can no longer function to pick up fibrous material from the surface of the batt. This problem is particularly serious when an excessive amount of fibers is fed to the batt-forming machine, which excess is removed by the peg roller. Moreover, a peg roller cannot of course compensate by adding fibers to the batt surface when an insufficient proportion of fibers is fed to the batt forming machine, a condition which is equally responsible for variations in the density of the batt.

In accordance with the present invention, a method and apparatus are provided which make it possible to control the feed of shredded, defibrated cellulose pulp material to a batt-forming machine according to the rate of output of batt from the machine. This output rate is adjusted according to the amount of fibrous material removed from the surface of the batt, determined, for example, in terms of the loading on a milling member such as a peg roller during removal of fibrous material thereby. It is apparent that when an excessive proportion of fibers is fed to the batt-forming machine, the loading on the milling member, such as a peg roller, will increase, and when the proportion of fibers fed to the batt-forming machine decreases, the loading on the milling member, such as a peg roller, will decrease.

Accordingly, in accordance with the invention, apparatus is provided for sensing the load of fibrous material removed by the milling member, such as a peg roller. When this load increases beyond a predetermined amount, the rate of feed of shredded defibrated cellulose material to the batt-forming machine is decreased correspondingly. When the loading on the peg roller decreases below a predetermined amount, the rate of feed of shredded defibrated cellulose material to the batt-forming machine is increased correspondingly. Thus, the rate of feed is controlled according to the loading on the milling member, with the result that a more uniform batt is produced, and variations in the rate of feed from the shredder and the defibrator are automatically compensated for by an increase or a decrease in the rate of shredding and/or defibration, respectively.

The method and apparatus of the invention are particularly adapted for use with moderately compressed and tightly compressed cellulose pulp material, such as moderately compressed or tightly compressed cellulose pulp rolls and sheets, but are of course applicable to loosely compressed cellulose pulp material as well, although application to such material is obviously less economic, and therefore such material would not be used except under unusual circumstances.

The process of the invention includes the steps of dry-shredding tightly compressed or moderately compressed cellulose pulp material to reduce the material to particulate form; feeding the shredded cellulose pulp material to a dry-defibrating stage; dry-defibrating the shredded particles; feeding the shredded and defibrated cellulose pulp material to a batt-forming stage; and forming a batt from the resulting material on a foraminous support; reducing the resulting batt to a uniform thickness and surface smoothness by removing fibers from the surface thereof; sensing the amount of fibrous material thus removed; increasing the rate of feed of shredded cellulose pulp material to the defibrating stage whenever the sensed amount is below a predetermined limit, and decreasing the rate of feed of shredded cellulose pulp material to the defibrating stage whenever the sensed amount is above a predetermined limit.

The apparatus in accordance with the invention comprises a dry-pulp shredder; a dry pulp defibrator; means for feeding at a selected rate dry-shredded cellulose pulp material from the dry-pulp shredded to the dry-pulp defibrator; means for feeding dry-shredded dry-defibrated cellulose pulp material to a foraminous support and depositing the material on the support to form a batt; milling means for removing cellulose pulp fibers from the surface of the batt; sensing means for determining the loading on the milling means while fibrous material is being thus removed; control means responsive to a sensed load below a predetermined minimum, to increase the rate of feed of shredded cellulose pulp material, and to a sensed load above a predetermined maximum, to decrease the rate of feed of shredded cellulose pulp material; and means for drawing off the resulting fibrous batt material.

In order to control the rate of feed of shredded and defibrated cellulose pulp material to the batt forming stage, there can be controlled any one or all of:

(1) the rate of feed of compressed cellulose pulp material to the shredder;

(2) the rate of feed of shredded cellulose pulp material to the dry defibrator; and (3) the rate of feed of the shredded and dry defibrated cellulose pulp material to the batt-forming stage.

Normally, however, it is sufficient to control only the rate of feed of compressed cellulose pulp material to the shredder, since a change in this rate of feed automatically results in a corresponding change of the rate of feed of the cellulose pulp material in all of the later stages.

The load sensing means can sense the amount of fibrous material removed either directly or indirectly, in any of several ways.

The means can, for example, measure directly the weight of material removed from the fibrous batt, and, when this weight is below a predetermined minimum or exceeds a predetermined maximum, adjust the feed rate of cellulose pulp material to the batt-forming stage accordingly.

Although indirect, it is equally accurate and somewhat less cumbersome to sense the torque required to rotate or drive a milling means such as a peg roller while it is removing excess fibrous material. As the load on the means increases, the amount of power required to operate the means also increases. Consequently, upon appropriate calibration of the torque in terms of power applied to operate the roller, one can note from the torque required to operate the means when the load is too light, indicating that too low an amount of fibers is being removed, and therefore too low an amount of fibers is being fed to the batt-forming stage, as well as when the load is too high, indicating that too large an amount of fibers is being removed, and therefore the rate of feed of defibrated fibrous material to the batt-forming machine is too high. This torque can be measured electrically, or electronically, or mechanically, and compensated for by changing the rate of feed correspondingly, reducing it or increasing it, as required, according to the load sensed. Such a device is illustrated in the embodiments shown in the drawings.

Although the defibrated fibrous material can be supplied to the forming conveyor in any suitable known manner and by any suitable known means, it is particularly suitable to supply said material by means of a stream of air initially in surplus quantities. Normally, the fibrous material is supplied to the forming conveyor from above while the surplus material is removed in a direction opposite to the direction in which the forming conveyor moves, the removed surplus material being subsequently returned to the forming conveyor as freshly supplied fibrous material. By continuously circulating surplus fibrous material in the supply zone above the forming conveyor, variation in supply can be compensated for in part by said surplus material. However, it has now been found particularly favorable to supply the fibrous material to the forming conveyor according to a preferred embodiment of the present invention, in a direction which coincides at least substantially with the direction in which the surplus material is removed from the web. In this way, removal of the surplus fibrous material from the fiber web is greatly facilitated and the admixture of surplus fibers and the fibrous material conveyed to the housing by the air streams is rendered more effective. This more effective admixture of the fibers means that variations in supply of fibrous material to the perforated web are equalized by the circulating surplus of fibers in a particularly effective manner while using particularly simple means.

The drawings illustrate preferred embodiments of the invention.

Figure 1:
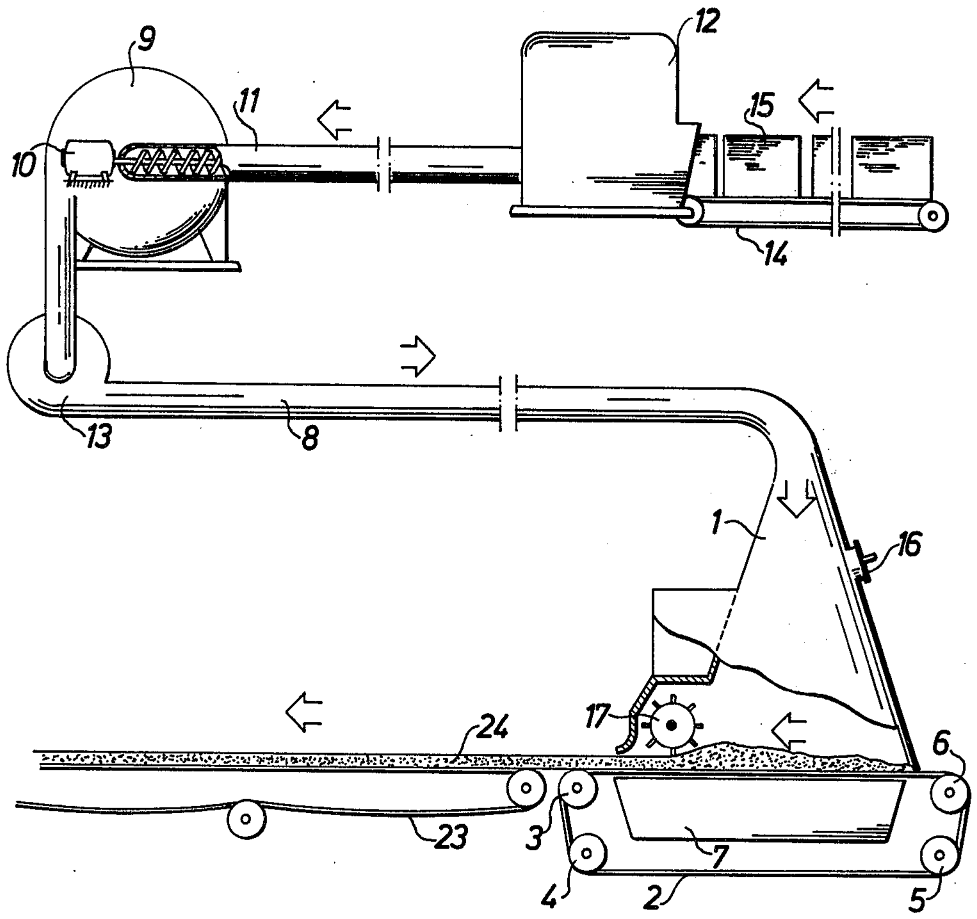
FIG. 1 shows in side elevation one embodiment of the apparatus for shredding and defibrating compressed cellulosic pulp material, and forming a batt from the resulting fibrous material.
Figure 5:
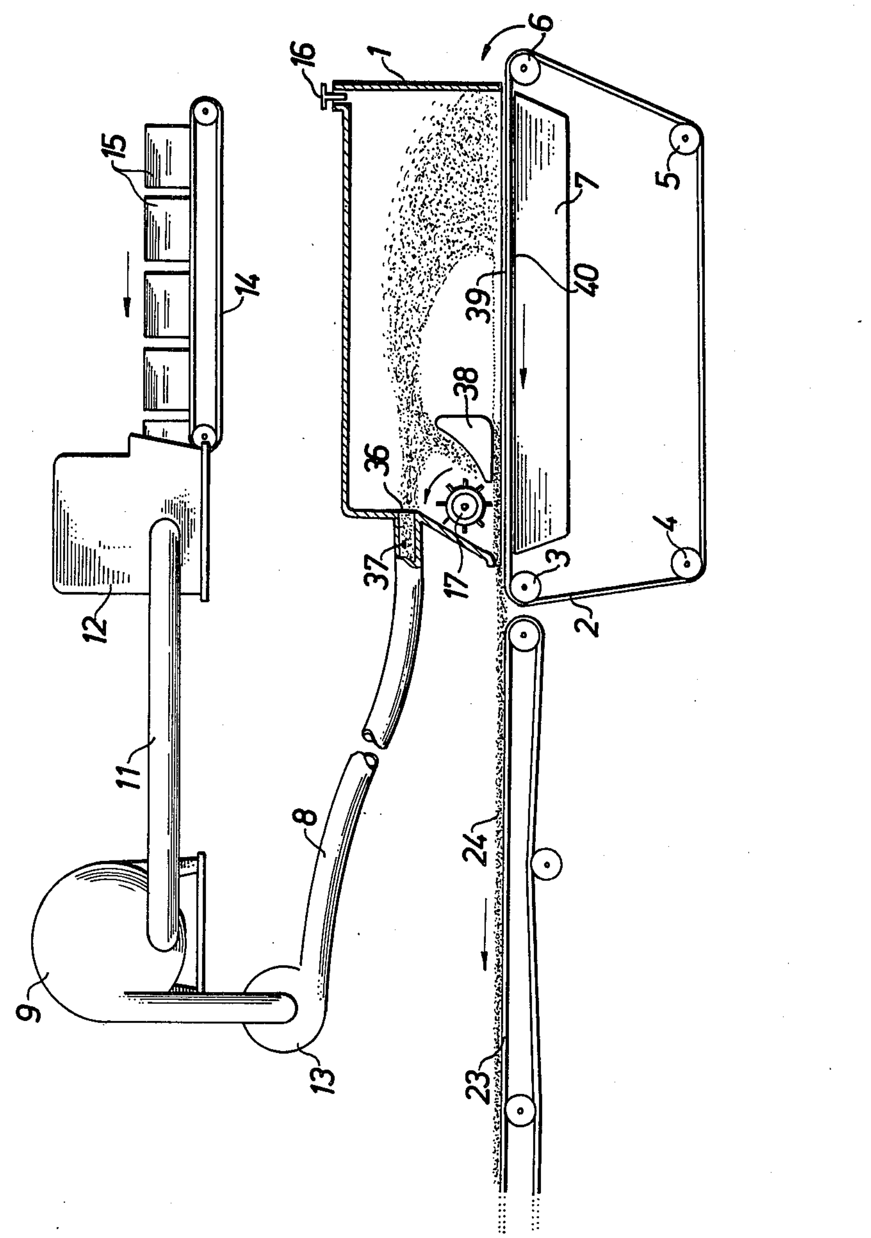
FIG. 5 shows in side elevation another embodiment of apparatus according to the invention.

In FIGS. 1 and 5, stage A represents the shredding stage; stage B the dry defibration stage; and stage C the batt-forming stage of the process and apparatus of the invention.

Figure 2:
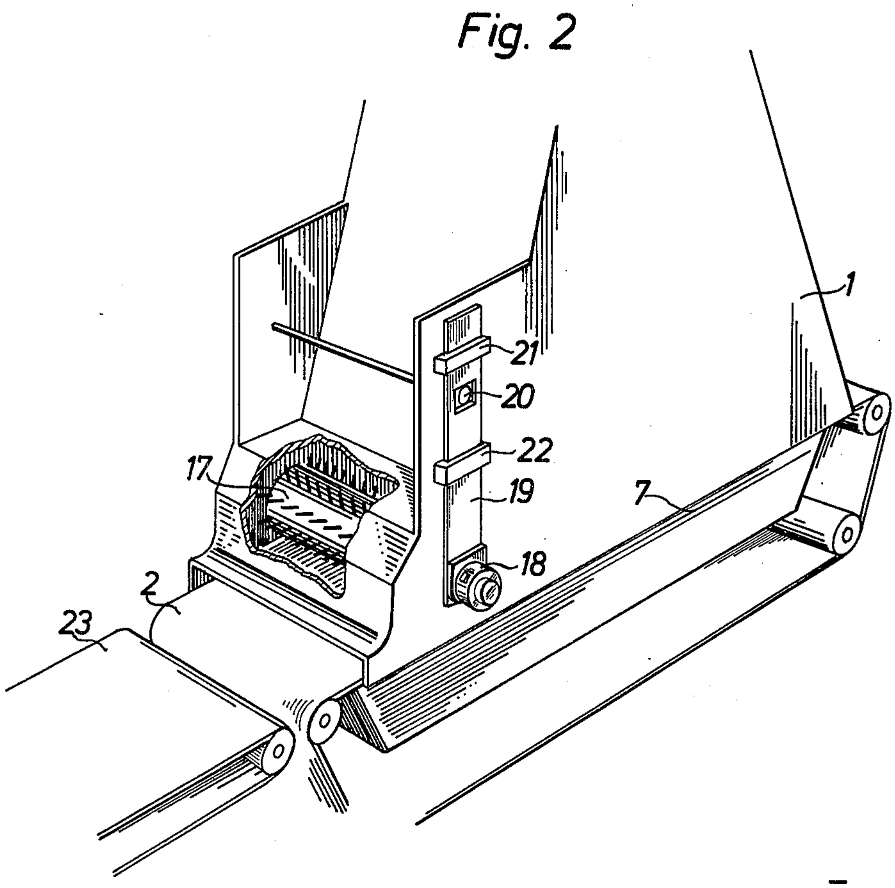
FIG. 2 is a detailed view of the bearing mechanism for the milling means, a peg roller, of FIG. 1.
Figure 3:
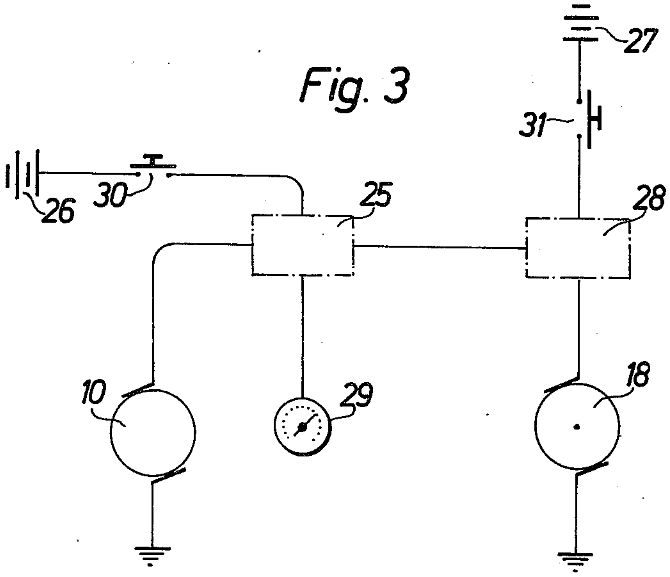
FIG. 3 shows the electirc circuit for sensing the load of fibrous material on the peg roller of FIG. 1, and correspondingly controlling the rate of feed of shredded defibrated fibrous material to the batt-forming stage of the apparatus.

The apparatus of FIGS. 1 to 3 has three stages: shredding stage A, defibrating stage B, and batt-forming stage C.

Air-borne shredded defibrated fibrous material from the defibrating stage B is carried to the batt-forming stage C via conduits 8*a*, 8*b*, to and through the hood 1, which opens out towards the foraminous batt-forming support 2, in the form of an endless conveyor belt. The belt 2 travels around the rollers 3,4,5,6, of which roller 3 is driven and rollers 4,5 and 6 are idler rolls. A suction box 7 arranged beneath the foraminous belt 2 draws a flow of air through the belt, and thereby draws the air-borne fibers through the hood down upon the belt, forming a fibrous batt 24 thereon. Adjustment of the amount of suction applied in the box 7 according to the flow of air through the feed tube 8*b* is made possible by the air inlet 16 in the hood 1, which can be opened or closed, as required, to control the proportion of bleed air and thereby adjust the amount of suction to the required degree.

The defibrator 9 in the defibrating stage B feeds the defibrated cellulose material through the tube 8*a* to the fan 13, where it is entrained in a stream of air and blown through the tube 8*b*, into the hood 1, where it is carried by air flow down onto the belt 2. The dry defibrator 9 is, for example, of the disc type.

Coupled to the defibrator 9 and driven by the motor 10 is a screw conveyor 11, which carries the shredded pulp from the shredding stage A. The shredder 12 is of conventional type, and is designed for shredding tightly compressed or moderately compressed cellulose pulp, in roll or sheet form, or in bales 15, the form illustrated in the Figure. A conveyor 14 is provided for feeding the bales 15 of cellulose pulp to the shredder 12. Adjustment of the rate of travel of the conveyor 14 adjusts the rate of feed of bales of compressed cellulose pulp to the shredder 12, stage A, and whether this is fast or slow of course to some extent controls the rate of feed of cellulose pulp material to each of the following stages B and C of the system.

Similarly, control of the rate of feed of shredded pulp material from shredder 12 is controlled by the motor controlling the rate of rotation of the screw conveyor 11, and control of the rate of feed of shredded and defibrated pulp material through the lines 8*a*, 8*b* is controlled by the fan 13.

Provision is made for reducing the fibrous batt 24 formed on the foraminous support 2 beneath the hood 1 to a uniform thickness in the form of the peg roller 17, which is rotatably mounted in an antechamber 1*a* at the exit end of the hood 1, in the manner shown in FIG. 2, extending across the conveyor belt 2. The motor 18 (see FIG. 3) is arranged to drive the peg roller 17. The axle 17*a* of the roller 17 is journaled in the bearing supports 19 (of which only one is shown in FIG. 2) which are movable vertically within the guide members 21,22 by the cams 20. The pegs 17*b* pluck fibrous material from the batt 24, and throw the fibers back out into the hood 1.

A second conveyor belt 23 receives the fibrous batt 24 after milling by the peg roller 17, and carries it on for further processing or storage.

Figure 4:
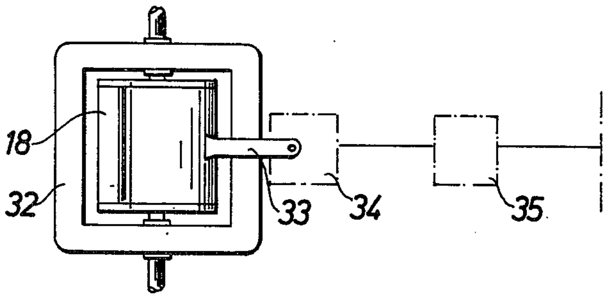
FIG. 4 shows an electromechanical control system for controlling the rate of feed of fibrous material according to the loading of fibrous material on the peg roller 17 of FIG. 1.

The electrically operated control system for the apparatus controlling the rate of feed of fibrous material to the batt-forming stage C is best seen in FIGS. 3 and 4. In this embodiment, the control system controls the rate of rotation of the screw conveyor 11, and thereby the rate of feed of shredded pulp material from the shredding stage A to the dry defibration stage B. However, one could also control the rate of movement of conveyor 14, or of fan 13, alternatively or together.

The control system, as is best seen in FIG. 3, includes a current controlling means 25, provided with a rectifier in electrical connection with the motor 10 of the screw conveyor 11, and an electric power supply 26 via the switch 30. The current controlling means 25 may, for example, be of the type ASEA QALB 200.

The current controlling means 25 is also in electric connection with a current transformer 28, which in turn is coupled between the peg roller motor 18 and an electric power supply 27 via the switch 31.

The current controlling means 25 is also in electric connection with a potentiometer 29, which is manually adjustable so as to control the speed of the screw conveyor 11. The switches 30,31 put the motors 10,18, respectively, in connection with the power supply 26,27, and thereby start and stop the motors.

Operation of the apparatus is as follows: First, there are started, in order, the suction box 7, the peg roller 17, the fan 13, the defibrator 9, the conveyor 11, the shredder 12, the conveyor 2, the conveyor 23, and the conveyor 14. A starting feed rate for the screw conveyor 11 is established with the aid of the potentiometer 29, manually, such that the loading of the peg roller 17 is less than capacity. Pulp bales 15 are sent to the shredder 12 via the conveyor 14, where they are shredded into pieces from one half inch to one inch in diameter (1 to 2.5 cm). The shredded pulp is conveyed by the conveyor 11 to the defibrator 9, where it is defibrated and then discharged via line 8*a* to the fan 13, and then entrained in air and blown through the conduit 8*b* into the hood 1. The suction box draws the air and air-borne fibrous material down onto the foraminous conveyor 2, where the batt is formed by straining fibrous material out of the air flow. The control valve 16 is set to reduce the degree of suction to the desired value, usually established with a view to the density of the fibrous batt on the belt 2. The air in the suction box 7 is vented through the suction exhaust system, which is not shown.

The rate of feed is sufficient initially to always maintain and circulate a certain surplus between the peg roller 17 and the belt 2, such that the fibrous batt formed is slightly thicker than required, as a result of which some fibrous material is drawn off the top by the rapidly rotating peg roller 17, reducing the fibrous batt to the desired thickness, and at the same time smoothing it. The removed fibrous material is thrown back into the hood. The resulting batt is withdrawn from the hood and carried on the conveyor 2 onto conveyor 23, for further processing or storage, such as, for example, subdivision into absorbent pads for diapers, sanitary pads, compresses, and the like.

At the beginning of this operation, the current controlling means 25 receives a current from the current transformer 28 indicating a loading on the peg roller below a predetermined minimum. This loading however gradually builds up as the fibrous batt is formed, and increases in thickness, and eventually the loading on the peg roller falls within the range of normal operation (for which the potentiometer 29 is set), above the predetermined minimum, and below the predetermined maximum.

While the loading is below the predetermined minimum, the current controlling means delivers a signal corresponding to a below normal loading and as a result the rectifier increases the supply of current to the motor 10 of the conveyor 11, which increases the speed of the conveyor 11, which increases the rate of feed of shredded and defibrated fibers to the batt-forming stage C, and this in turn increases the rate of loading on the peg roller 17, so that it reaches a value above the predetermined minimum, less than the predetermined maximum. When this point is reached, the rate of feed is slowed to within the normal range by slowing down the conveyor 11, as the result of a reduction in current flow of the motor 10.

If the supply of fibrous material to the hood 1 increases, such that the loading on the peg roller 17 and consequently on the peg roller motor 18 exceeds the predetermined maximum value set on the potentiometer, the current controlling means 25 delivers an above-normal signal, following which the rectifier reduces the supply of current to the motor 10 of the conveyor 11, which reduces the speed of the conveyor 11, and results in a reduced flow of fiber material through the defibrator 9 and to the hood 1.

In this way, the rate of feed of shredded fibrous material to the defibrator is controlled exactly according to the loading on the peg roller 17, so that the loading of the peg roller 17 is held essentially constant, above the predetermined minimum and below the predetermined maximum.

The rate of feed of fibrous material to the conveyor 2 can of course be controlled in other ways.

In another embodiment, the torque required to rotate the peg roller at the desired speed is used directly to control the speed of the conveyor 10 through the control member. An example of such a system is shown in FIG. 4, in which the peg roller motor 18 is movably supported in a stationary frame 32. A torque arm 33 is rigidly fixed to the motor. The arm 33 is connected to a control resister 34, which through a rectifier 35 controls the current supplied to the conveyor motor 10 in response to the angular movement of the motor 18 in the frame 31. As this angular movement is substantially proportional to the loading on the motor 18, an automatic control of the speed of the conveyor 11, as a function of the loading on the peg roller, is obtained.

Figure 6:
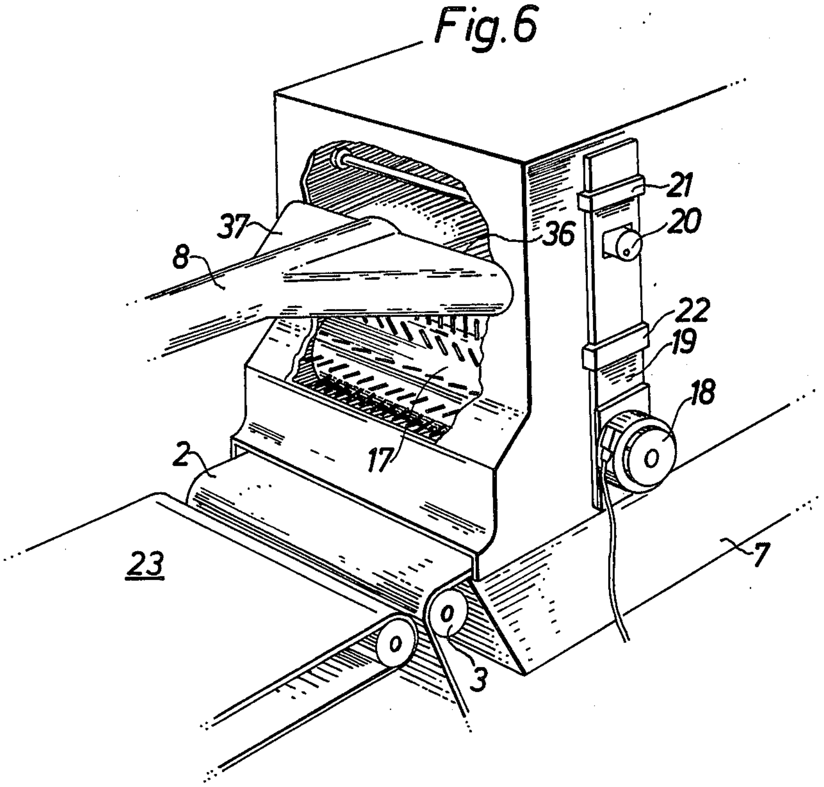
FIG. 6 is a detailed view of the bearing mechanism for the peg roller of FIG. 5.

FIGS. 5 and 6 show a second embodiment of the apparatus of the invention. In these drawings, some portions of the structure are the same as the structure of FIGS. 1 to 4, and consequently, these portions have been identified by the same reference numerals.

In this embodiment, the entry of the air-borne shredded defibrated fibrous material into the batt-forming stage is by way of the conduit **8*b*, which directs the flow of air-borne fibers substantially horizontally, rather than vertically, beneath the hood 1*b*. At the inlet 36, there is a nozzle 37, which ejects the air-borne fibers substantially horizontally at considerable velocity into the hood, in a trajectory over and beyond the peg roller 17**.

A baffle 38 serving as a guide plate may be arranged beside the peg roller 17, and receives and guides fibers which are thrown off the roller following their removal from the batt 24. The removed fibers proceed at some velocity along the surface of the baffle 38, and are thrown into the rapidly moving stream of air-borne fibers emerging from the nozzle 37 at the inlet port 36, and are thereby reentrained in the air flow, and redeposited on the foraminous support 2. It will thus be evident that the trajectory of the fibers thrown off the peg roller 17 follows the same general direction of flow of the air-borne fiber stream from the nozzle 37, which greatly facilitates reentrainment of the removed fibrous material into the air stream.

This apparatus operates in the following manner: A number of bales 15 of compressed pulp are placed on the conveyor 14. A reduced pressure is drawn on the suction box 7, and the valve **16*a* is opened to the desired degree. The peg roller 17, the shredder 12, the defibrator 9, the conveyors 2, 11, 14 and 23, and the fans 13 are then turned on, in that sequence. The bales are then fed in sequence into the shredder, where they are shredded into pieces from ½ to 1½ inches in diameter. The shredded pulp is carried by the screw conveyor 11 to the defibrator 9, where the pulp is defibrated, and the fibers released. The defibrated pulp is discharged through the conduit 8*a* to the fan 13, and then entrained in an air stream blown through the conduit 8*b*, nozzle 37, and inlet port 36 into the hood 1*b***.

The air-borne fibrous material is drawn down with the air carrying it onto the foraminous support 2, while the air passes through the support. Before doing so, the fibers may strike and bounce off the rear wall **1*c* of the hood 1*b*, but the fibers are nonetheless eventually deposited on the foraminous support 2 to form a batt 24. According to the degree of opening of the valve 16*a*, the degree of suction applied for drawing the fibers down on the foraminous support can be adjusted so as to avoid drawing an excessive suction, with a resulting disturbance in the fiber deposition. The air drawn into the suction box 7 through the support 2** is discharged continuously therefrom.

In the start-up of operation, surplus fibrous material is charged to the housing **1*b*. This fibrous material together with the air-borne fibrous material is laid down on the foraminous support. The rotating peg roller 17 removes excess fibrous material above a predetermined thickness, and throws such fibrous material outwardly toward the baffle 38, whence it is carried into the air-borne fiber stream from the nozzle 37, where it is returned to the air-borne fiber stream fed to the foraminous support 2**, where, once again, the fibrous material is drawn down upon the conveyor.

As the peg roller 17 removes excess fibrous material from the batt 24, it smooths the surface of the batt to an even thickness, and breaks up any clumps of fibers which may have formed.

In the same manner as in the apparatus of FIGS. 1 to 3, the speed at which the conveyor 11 moves is automatically controlled by the electrical circuit shown in FIG. 3, in a manner such that the load on the peg roller is kept substantially constant, and within the limits of above the predetermined minimum, and below the predetermined maximum.

After passing the peg roller 17, the batt 24 is discharged from the housing **1*b*, and transferred from the support 2 to the conveyor belt 23**, whence it passes to a processing station, where it can for example be either wound up or cut into absorbent pads, diapers, compresses, and the like.

An excess of fibrous material is intially charged to the housing 1 in order to provide a circulation of excess material within the hood. This assists in maintaining uniformity of density of the batt formed, and compensates for any irregularities in the feed of shredded defibrated cellulose pulp material to the hood **1*b***. The result is an improved uniformity.

Moreover, in this embodiment, since the trajectory of the air-borne fibers from nozzle 37 intersects the trajectory of the fibers from roller 17, the circulation path of the fibers within the hood **1*b* is very short. This, taken in conjunction with the automatic control of the load on the peg roller, affords the additional advantage that the amount of power required for effecting circulation of the excess fibers is correspondingly low, and the circulation of excess material can in fact be obtained solely by means of the peg roller and the flow of air-borne fibers through the nozzle 37**.

It will be apparent that in lieu of one peg roller, two or more peg rollers can be provided. Moreover, the roller need not be provided with a plurality of pegs, but any milling means can in fact be provided, with any kind of surface that can engage, pluck or otherwise remove fibers from the surface of the batt, such as a brush surface, a toothed surface, a knurled surface, or a grooved surface.

It is also possible to divide the suction box 7 into separate compartments, each with separate suction means, and each if desired with its own peg roller or similar milling means. This serves to prevent variations in thickness and density of the batt on the foraminous support 2, upstream of the peg roller, from causing corresponding changes in the suction box, and thereby local variations in the density of the batt.

Figure 7:
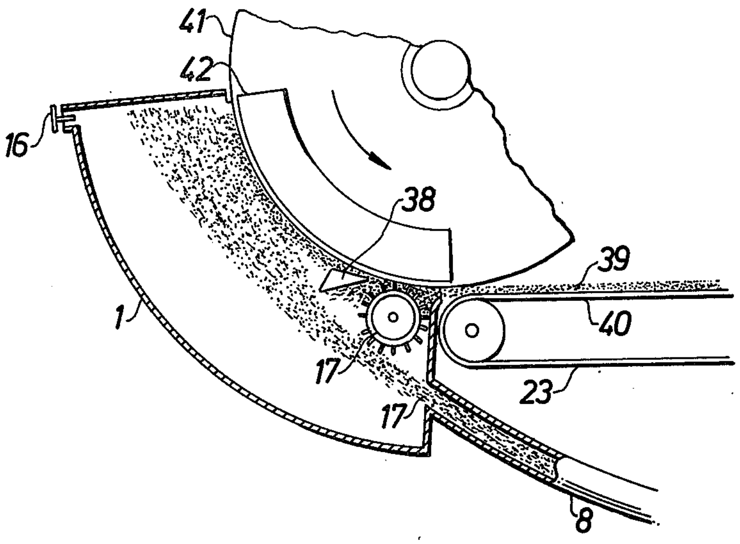
FIG. 7 shows in side elevation another embodiment of the batt-forming stage C in apparatus according to the invention.

In the embodiment of the invention illustrated in FIG. 7, the foraminous support 2 is replaced by a hollow drum 41, rotatably mounted with a foraminous cylindrical surface. In this case, as seen in FIG. 7, the hood 1e is of an arcuate configuration, and is arranged above the drum 41 so as to extend substantially from one end of the drum to the other end, and encloses an arc segment of the cylindrical surface of the drum, with the inlet opening 36a oriented for introduction of a flow of air-borne fibers in the direction of rotation of the drum. This device also includes a peg roller 17, and a baffle 38, operating in the same manner as the device of FIGS. 5 and 6. While the embodiment illustrated has only one peg roller, several peg rollers can be provided, as described above.

The suction box 42 is arranged within the drum, directly beneath the hood 1e, and, like the hood, is fixed against rotation. The suction box can be divided into separate chambers, each provided with independently operated suction means, if desired.

The formed batt after milling to reduce it to a uniform thickness and surface smoothness is discharged from the drum surface onto the conveyor 23 at a portion of the drum beyond the suction box, so that the batt is no longer held down on the drum surface.

In this embodiment, also, an excess of fibrous material is initially charged to the hood 1e, and circulates therein throughout the batt forming operation.

In other respects, the operation of the device is as described in connection with the previous embodiments.

While it is particularly suitable to carry the defibrated fibrous material air-borne to the foraminous support, and form the batt thereon by deposition from the airstream, the shredded defibrated fibrous material can also be carried to the foraminous support in other ways, such as, for example, by a screw conveyor, and then dropped upon the foraminous support by gravity. Deposition can be expedited by a flow of air through the valve 16, as shown in each of the embodiments, the air aiding in carrying the fibers down onto the surface of the foraminous support. However, air-borne fibers are more advantageous in obtaining a uniform distribution of fibers throughout the surface of the foraminous support, during laydown.

Having regard to the foregoing disclosure, the following is claimed as the inventive and patentable embodiments thereof:

1. Apparatus for preparing batts of relatively uniform density from shredded, defibrated cellulose pulp material, which comprises, in combination, a dry-pulp shredder; a dry pulp defibrator; means for feeding at a selected rate dry-shredded dry-defibrated cellulose pulp material to a foraminous support, and depositing the material on the support to form a batt; milling means for removing cellulose pulp fibers from the surface of the batt; sensing means for determining the loading on the milling means while fibrous material is being thus removed; control means responsive to a sensed load below a predetermined minimum, to increase the rate of feed of shredded defibrated cellulose pulp material, and to a sensed load above a predetermined maximum, to decrease the rate of feed of shredded defibrated cellulose pulp material; and means for drawing off the resulting fibrous batt material.

2. Apparatus according to claim 1, comprising sensing means for weighing the removed fibrous material.

3. Apparatus according to claim 1, comprising sensing means for determining the torque required to operate the milling means under the load of fibrous material.

4. Apparatus according to claim 1, comprising means for controlling the amount of fibrous material removed by measuring directly the weight of material removed from the fibrous batt, and, when this weight is below a predetermined minimum or exceeds a predetermined maximum, adjusting the feed rate of cellulose pulp material to the batt-forming stage accordingly.

5. Apparatus according to claim 1 comprising a conveyor for carrying shredded cellulose pulp material from the shredder to the defibrator; means for entraining shredded, defibrated cellulose pulp material from the defibrator in a stream of air and driving the airborne fibrous material to the foraminous support; suction means for drawing the air stream through the support and forming a batt thereon of shredded, defibrated cellulose pulp material; and at least one rotatable milling means arranged across the foraminous support to remove excess fibrous material from the top surface of the batt and to smooth the surface of the fibrous batt.

6. Apparatus according to claim 5 comprising a housing within which is disposed the foraminous support and the milling means; an inlet in the housing for the stream of air-borne fibrous material, and means arranged adjacent the milling means for reentraining removed fibrous material in the air stream and redepositing such fibrous material on the foraminous support.

7. Apparatus according to claim 6, in which the milling means is arranged to throw removed fibers in the same direction as the stream of the air-borne fibrous material.

8. Apparatus according to claim 1, in which the control means comprises a current controller and an adjustable potentiometer connected thereto, which cooperate to control the rate of feed according to the load on the milling means.

9. Apparatus according to claim 1 in which the control means comprises a torque arm and a control resistor and the milling means motor is pivotably supported in a stationary frame, the torque arm being rigidly fixed to the milling means motor, and adapted to cooperate with the control resistor to control the rate of feed according to the torque of the milling means motor in the frame.

10. Apparatus according to claim 1, in which the foraminous support comprises an endless foraminous conveyor.

11. Apparatus according to claim 1, in which the foraminous support comprises a rotatable drum having a foraminous cylindrical surface.

12. Apparatus according to claim 1, in which the milling means comprises a rotatable motor-driven spiked roller.

13. Apparatus according to claim 1, in which the milling means comprises a rotatable motor-driven brush roller.

14. Apparatus according to claim 1, in which the milling means comprises a rotatable motor-driven cam roller.

15. Apparatus according to claim 1, in which the milling means comprises a plurality of rollers arranged in parallel.

16. Apparatus according to claim 1, having means for varying the distance of the milling means from the foraminous support so as to form batts of varying thickness.

17. Apparatus according to claim 1 having a suction box beneath the foraminous support, connected to a suction source.

18. Apparatus according to claim 1, having adjacent the milling means a baffle for guiding removed fibrous material thrown from the milling means into air-borne fibrous material for redeposition on the foraminous support.

* * * * *